March 31, 1953  J. W. WABER  2,633,177
INNER TUBE FOR PNEUMATIC TIRES
Filed April 24, 1947  3 Sheets-Sheet 1

Inventor
James W. Waber
By Raymond W. Colton
Attorney

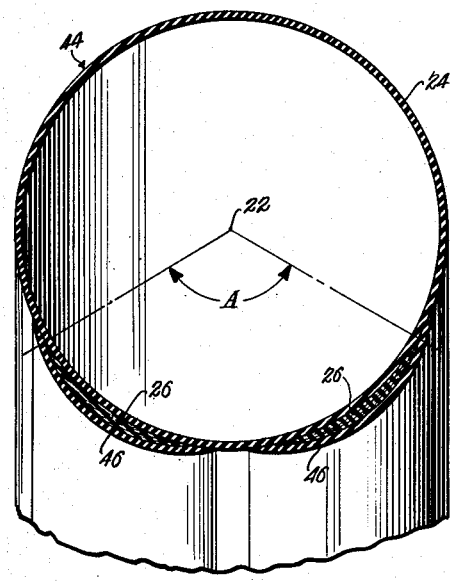
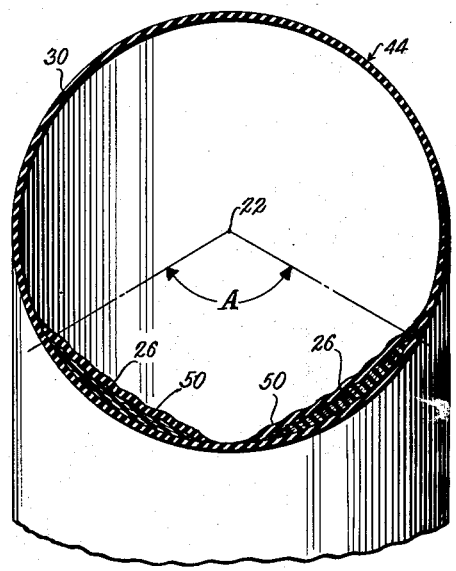
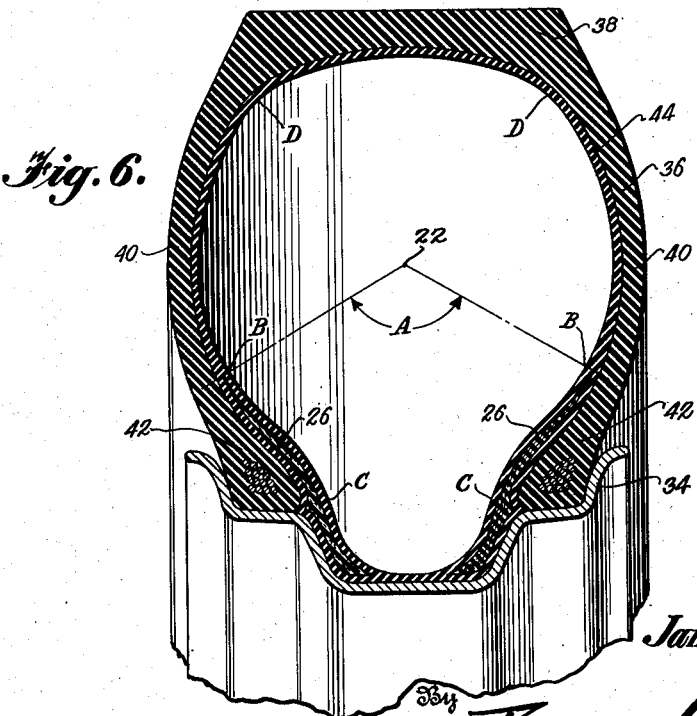

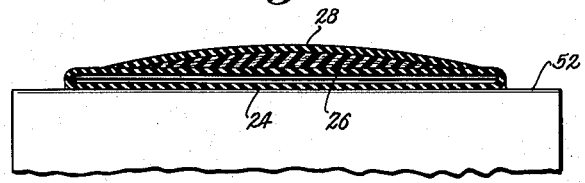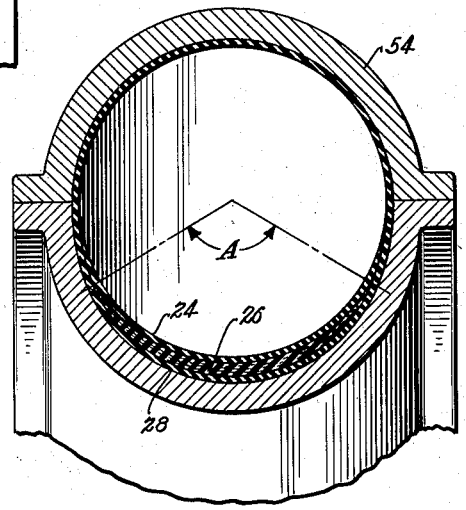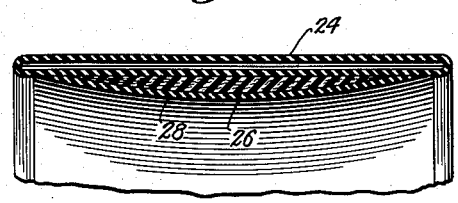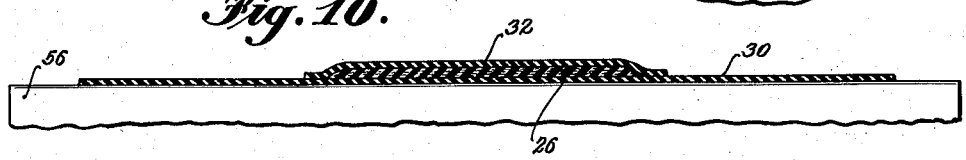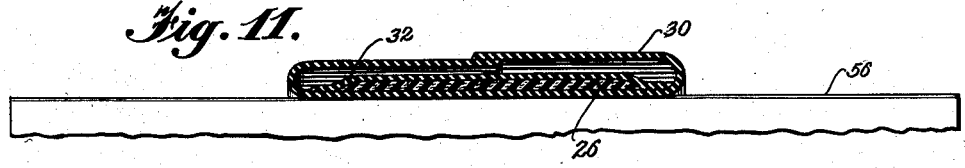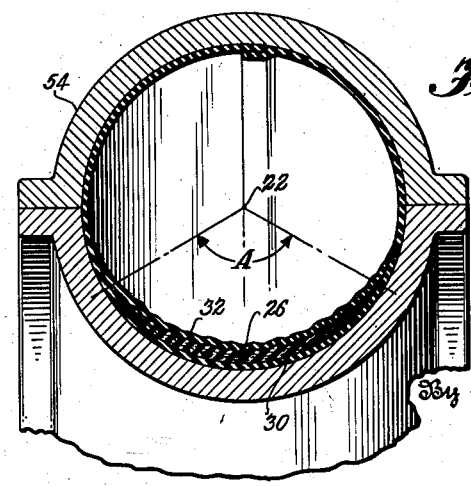

Patented Mar. 31, 1953

2,633,177

UNITED STATES PATENT OFFICE 2,633,177

INNER TUBE FOR PNEUMATIC TIRES

James W. Waber, Chicago, Ill.

Application April 24, 1947, Serial No. 743,639

18 Claims. (Cl. 152—347)

One of the most frequent single causes of failure of pneumatic tires, and one that has apparently been neglected throughout the history of the art, is what is commonly known as "rim pinch." Although this source of trouble has existed from the earliest days of the inner tube, and has been extremely costly from the standpoints of personal injury and damage to property, its effects have been increased rather than reduced by a number of the developments of recent years. The use of reduced pressures in balloon and semi-balloon tires, the adoption of the drop-center rim, the trend towards wider base rims, and the applications of synthetic rubber have contributed appreciably to the dangers and frequency of rim pinch; and although manufacturers in the automotive and tire industries have studied the problems at length, neither they nor the thousands engaged in tire maintenance and repair, nor the millions of vehicle operators have come forward with a satisfactory solution. Such expedients as the use of liners on the one hand, and increasing the tube thickness at the rim and bead zones on the other, have often delayed the failures of tubes from this cause, but never satisfactorily prevented them.

The art is replete with disclosures of so-called "puncture proof" tires and tubes, and the use of self-healing or self-sealing compositions at the inner and outer peripheries of inner tubes for this purpose may be found in many patents including those in the name of the present inventor, No. 1,808,091, dated June 2, 1931, and No. 2,161,490, dated June 6, 1939; but such concepts have been a far cry from the problems presented by casing bead injury and rim pinch. After many years of experience in the tire and tube art, supplemented by extended research on the specific problems presented by casing bead injury and rim pinch, the present inventor submitted applications for Letters Patent, Serial No. 532,333, filed April 22, 1944; Serial No. 575,984, filed February 3, 1945; and Serial No. 586,119, filed April 2, 1945, all abandoned, of which this application is deemed to be a continuation-in-part.

When an inner tube of standard construction is completely inflated within a rim mounted casing, it is expanded until it assumes the size and shape of the chamber defined by the rim and casing, the outer wall of the tube ultimately conforming to the internal walls of the chamber so defined. During the initial stages of its expansion, the tube receives a substantially toroidal form until its tread and side wall zones bear upon the corresponding zones of the casing with sufficient force to restrain further expansion in these zones.

Further distension of the tube then occurs principally in the bead and rim zones with the result that the tube wall in these zones undergoes an appreciably greater degree of stretching than that experienced in its tread and side wall zones. Consequently the wall thickness of a standard inflated tube becomes substantially less at the rim and bead zones. Continued inflation exerts progressively greater stretch upon progressively diminishing portions of the tube, so that frequently, localized areas reach conditions of high stress and even rupture. Yet it is in these highly stressed zones that the toes of the casing beads engage the rim and define relatively sharply converging annular grooves which the tube walls must fill; it is here that the greatest relative movement between the casing and rim is experienced in service; and it is here that rust and other destructive influences are so often encountered. Hence, it is small wonder that it is here, due to repeated flexure of portions of the tube wall under excessive tension, fatigue, the primary cause of the trouble, produces the effect known as rim pinch.

It is towards the solution of these problems that this invention is directed, and based upon the tubes and methods of producing the same conceived by the present inventor, the motoring public can at last be spared the anguish to which it has been subjected these many decades because of the ever present dangers of the effects of casing bead injury and rim pinch.

The objects of this invention are achieved by interposing a body of easily displaceable unvulcanizable plastic composition, which may also possess self-healing or sealing characteristics, between the air chamber of the inner tube and the chamber defined by the wheel rim and casing so that the composition bridges the junction of the bead and rim zones, the easily displaceable permanently flowable composition conforming to the irregularities such as the rather sharp annular grooves defined at the bead and rim joints, promoting substantially uniform stresses upon the air confining wall of an inflated tube in these zones and thus obviating sharp bending and excessive distortion of the air confining wall of the tube. The plastic composition though always displaceable to fulfill its function, is preferably confined in a general way to its circumferential position with respect to the generatrix axis of the tube, by securing to the tube wall beyond the edges of the plastic material, a covering strip or annulus of vulcanizable resilient material similar in composition to that constituting the tube itself, defining with the original tube wall, a closed pocket confining the composition. The covering strip is preferably secured to the tube wall by vulcanization, and the plastic composition and its covering strip may be applied externally or internally to the tube wall as dictated by the requirements to be met in service.

The plastic composition extends, from portions of the tube cross-section displaced by not less than 90° with respect to the generatrix axis of the tube, the preferred angle being approximately or at least 120° towards the rim zone. The composition is preferably symmetrically disposed with respect to the rim zone, being of substantially annular form. The annular body of plastic composition may be substantially uninterrupted or may assume the form of two spaced annuli, again dictated in part by service conditions to be encountered and the characteristics of the tire casing with which it is employed.

A more complete understanding of the invention will follow from a detailed description of the examples thereof depicted in the accompanying drawings, wherein:

Fig. 4 is a fragmentary sectional elevation of an inner tube embodying spaced annular plastic bodies;

Fig. 5 is a fragmentary sectional elevation of a modified form of the tube of Fig. 4;

Fig. 6 is a fragmentary sectional elevation of an inner tube of the type shown in Figs. 4 and 5 assembled with a casing and rim;

Figs. 7, 8 and 9 are fragmentary sections illustrating steps employed in producing a tube of the type shown in Fig. 1; and Figs. 10, 11 and 12 are fragmentary sections illustrating steps employed in producing a tube of the type shown in Fig. 2.

Figure 1:
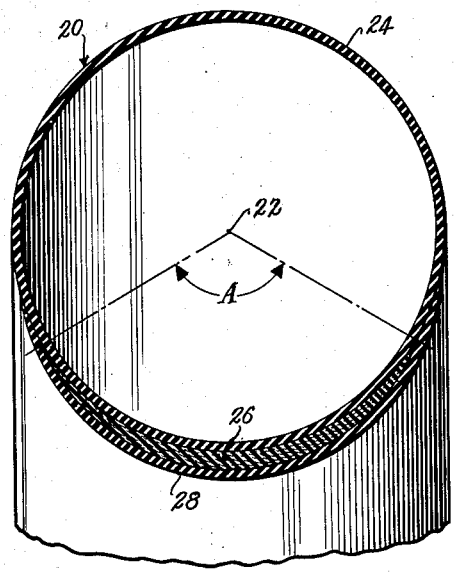
Fig. 1 is a fragmentary sectional elevation of an inner tube illustrating this invention.

With reference to Fig. 1, an inner tube 20, embodying one form of the present invention, is shown as inflated to a substantially toroidal form having a generatrix the locus of whose center 22 lies in a radial plane. The wall 24 of the tube is composed of resilient vulcanized or vulcanizable material, such as natural or synthetic rubber, and is in all respects similar to inner tubes of standard manufacture. To that portion of the exposed inner periphery of the wall 24 defined by the rim and bead zones thereof, as indicated by the arc subtended by an angle A, there is applied a body of unvulcanizable easily displaceable plastic composition 26 having a cross section of crescent-like configuration. This plastic composition is covered by a layer of strip material 28 having a composition similar to that of the wall 24 of the tube, the edges of the strip 28 extending beyond the plastic composition, being suitably secured to the wall 24 of the tube, preferably by vulcanization. As depicted in Fig. 1, the easily displaceable plastic material 26 extends symmetrically with respect to the plane of the generatrix axis over an arc of approximately 120° of the tube cross section. The extent of this arm may be varied within such limits as will assure complete bridging by the plastic composition of the junctions between the rim and beads of the casing with which the tube is to be used.

Figure 2:
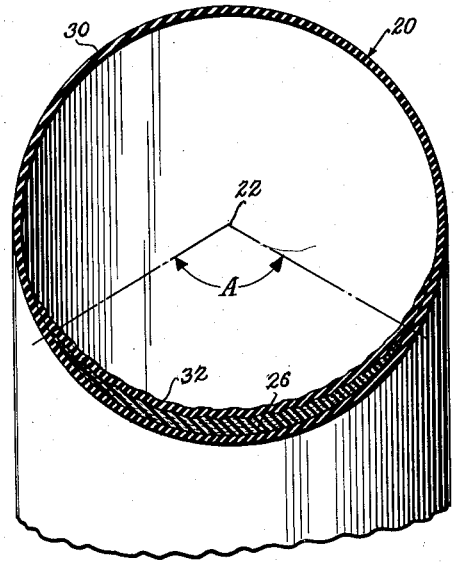
Fig. 2 is a fragmentary sectional elevation of another contemplated form of inner tube.

Whereas the plastic composition and cover strip layers of Fig. 1 are located externally on the inner periphery of the tube wall; in Fig. 2, corresponding layers have been depicted as applied internally to the inner periphery of the tube wall 30. In this case, the unvulcanizable easily displaceable plastic composition 26 having a crescent-like cross-sectional configuration is confined to its required position in a general way, by a strip of vulcanizable material 32 whose projecting edges are secured by vulcanization to the internal surface of the tube wall 30. Here again, the extent of the easily displaceable composition has been depicted as approximating 120° with respect to the plane of the generatrix axis 22, and in this case as well, the critical extend is determined by the positions of the joints defined by the casing beads and rim with which the tube is to be used.

Although the tube 20 of Fig. 2 has been shown as inflated to substantially toroidal form, it will be noted that the innermost surface of the strip 32 forming a portion of the air chamber wall is in a fluted or wrinkled condition and can therefore be extended appreciably by additional inflation before being subjected to tensile stress. This condition is a result of the manner in which the tube is fabricated, to be described hereinafter.

It will be clear that the easily displaceable plastic composition and its cover strip as described with respect to each of Figs. 1 and 2, extend annularly throughout the rim and bead zones of the inner periphery of the tube and will be uninterrupted except where a valve may be inserted. Inasmuch as the easily displaceable plastic composition may also possess self-healing properties, it will follow that where such properties are present, the tube can be inflated and deflated in a known manner is illustrated in the patent to Richardson, 1,930,182, dated October 10, 1933, by means of a hollow needle.

Figure 3:
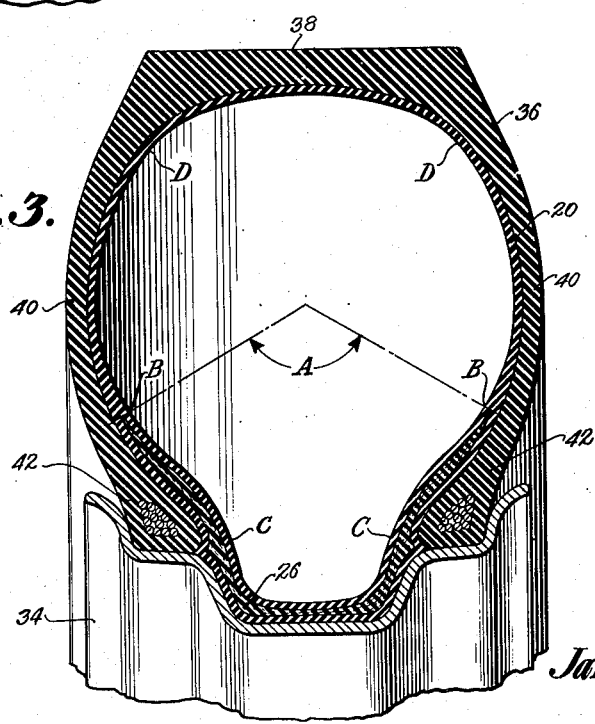
Fig. 3 is a fragmentary sectional elevation of an inner tube of the type shown in Figs. 1 and 2 assembled with a casing and rim.

Either of the tubes of Fig. 1 or Fig. 2 may be assembled as shown in Fig. 3, with a rim 34 and a casing 36 which define a chamber for receiving the tube 20. Despite the fact that the tube 20 in this figure has been shown as completely inflated, it will be noted that the portion of the tube wall defining the air confining chamber in the bead and rim zones has a relatively smoothly defined contour of substantially uniform thickness, made possible by the presence of the unvulcanizable easily displaceable plastic composition 26 which flows readily to compensate for the sharp irregularities and angularities existing in the chamber defined by the rim and casing.

The casing 36 provides the usual tread portion 38, side wall portions 40 and beads 42, and correspondingly, the tube 20 possess a tread zone DD, side wall zones BD, bead zones BC and a rim zone CC. As will be understood by those skilled in the art, when the tube is inflated, its bead and side wall zones will first frictionally engage the corresponding portions of the casing, so that further inflation will be predominantly effective upon and impart greater stress to the tube wall in its bead and rim zones. Portions of the tube wall within the bead and rim zones will progressively engage the wall of the chamber defined by the casing and rim in this area, the greatest stress being imposed upon that portion of the tube which last engages the chamber wall. This is usually that portion of the tube which is reversely bent to fill the sharp grooves defined at the junctions of the beads and the rim, approximately indicated in the drawings by the letter C. Since a double wall, spaced by the easily displaceable composition 26, is provided in the rim and bead zones of the present construction, the stresses at these joints will be imposed upon the outer wall which does not define the air confining chamber of the tube, and the plastic material will flow to assume a position such that the inner wall of the tube in this area will retain a relatively smooth contour and thus will not undergo such excessive stresses as customarily promote the fatigue and rim pinch of standard products. Even the outer wall which is distorted to fill the grooves defined between the beads and rim will not suffer as greatly as would be the case with a standard inner tube, since a great portion of the forces imposed will be absorbed by movement of the plastic composition and thereby transmitted over a large area of the tube wall.

The tube 44 depicted in Fig. 4 is somewhat similar to the tube 20 shown in Fig. 1, the principal difference being that the unvulcanizable easily displaceable plastic composition 26 and the vulcanizable strips 46 confining the plastic composition to the exterior surface of the inner peripheral portions of the tube wall 24, assume the form of spaced annular bodies arranged substantially symmetrically with respect to the plane of the generatrix axis 22. In this case, each of the annular strips of plastic composition is of substantially crescent form and is covered by a vulcanizable strip 46 whose edges are secured to the wall of the tube as by vulcanization. The proximate edges of the plastic annuli may be spaced by any suitable arc so long as the plastic composition will definitely bridge the junctions of the beads and rim of the assembly with which the tube is to be used.

The tube 44 depicted in Fig. 5 bears the same relationship to the tube of Fig. 2 as the tube of Fig. 4 bears to that of Fig. 1. As depicted in Fig. 5, the unvulcanizable easily displaceable plastic composition 26 in the form of two crescent-like annuli, is applied internally of the wall 30 of the tube in that portion of the bead and rim zones as will definitely bridge the joints between the beads and rim of the installation for which the tube is intended. Each of the spaced plastic annuli is covered and confined by a strip of vulcanizable material 50 whose edges will be secured to the internal wall of the tube by vulcanization. Here again, the inwardly directed surfaces of the strips 50 are fluted or wrinkled, thus permitting substantial inflation of the tube before any stress in tension is imposed upon these strips.

The spacing of the proximate edges of the bodies of plastic composition in Fig. 5 is subject to the same conditions as discussed with reference to the corresponding bodies of Fig. 4. In each of Figs. 4 and 5, the remote edges of the bodies of plastic compositions are displaced by an angle of approximately 120° with respect to the generatrix axis, although here again, this angle might be as small as 90° so long as the requirement that the joints between the beads and rim of the ultimate assembly are bridged, is satisfied.

The assembly of Fig. 6 includes a casing 36 mounted on a rim 34 to define a chamber for receiving the tube 44 of either Fig. 4 or Fig. 5. Wherever applicable, the reference characters of Fig. 3 have been incorporated in Fig. 6. The outstanding difference between Figs. 3 and 6 resides in the discontinuity of the plastic composition 26 and cover strips in the rim zone, due to the fact that the plastic composition has been applied in the form of spaced annuli. Inasmuch as the plastic composition completely bridges the joint formed by each bead with the rim, there is no undue stress imposed upon the internal wall of the tube defining the air chamber, the distortion at these points being imposed upon the outer wall which does not constitute the air chamber, the irregularities and movements being compensated by the flowing of the plastic composition so that the contour of the inner wall of the tube in this area is relatively smooth and its thickness substantially uniform.

Whereas the composition of the unvulcanizable easily displaceable plastic composition may vary appreciably, an example of such a composition, representing a successful application is:

|  | Percent |
|---|---|
| Rubber #1 smoke sheets | 40 |
| Tube reclaim (no free sulphur) | 42 |
| Rosin oil | 18 |

A suitable composition, by way of example, which may be used for the inner tube itself and for the cover strip for confining the plastic composition, may be as follows:

|  | Parts |
|---|---|
| Rubber (smoked sheets) | 100.00 |
| Stearic acid | 1.00 |
| Trimethyl - dihydroquinoline (Agerite resin D) | 2.00 |
| Zinc oxide | 5.00 |
| Soft carbon (P 33) | 40.00 |
| Sulfur | 0.75 |
| Mercaptobenzothiazole (Captax) | 0.75 |
| Benzothiazyl Disulfied (Altax) | 0.75 |
| Tetramethylthiuram Disulfide (Tuads) | 0.25 |
| Tellurium (Telloy) | 0.50 |

Tubes of the type depicted in Figs. 1 and 4 may be produced in accordance with a method to be described with reference to Figs. 7, 8 and 9. As shown in Fig. 7, a tube defined by the wall 24 in the form of an endless tubular body may be produced in any of the ways commonly known in the art for the production of standard inner tubes. This tubular body 24, whether it be vulcanized or as yet unvulcanized, is applied to a drum 52, the surface of the tube in contact with the drum being that which will ultimately define the outer periphery of the tube. To the exposed surface of this tube, there is applied an annular body of unvulcanizable easily displaceable plastic composition 26 so as to completely cover the exposed surface of the tube annularly over a transverse portion thereof sufficient to extend over the required portions of the bead and rim zones of the finished tube. This procedure applies specifically to the form of tube depicted in Fig. 1, it being understood that a similar series of steps involving spaced bodies of the plastic material would be followed to produce a tube of the type depicted in Fig. 4. It is convenient to preform the plastic composition 26, as by extrusion, before it is applied to the tube. The cover strip 28 which might also be extruded or otherwise formed is then applied over the plastic composition, the edges of the cover strip being secured to the portions of the tube beyond the plastic composition.

The composite tube thus formed is removed from the drum 52 and turned about its generatrix axis until the plastic composition and its cover strip define the inner periphery as indicated in Fig. 8. In this condition, the composite tube is placed in a mold 54, inflated, and cured in accordance with the procedure normally employed in the manufacture of standard inner tubes.

The production of tubes of the type shown in Figs. 2 and 5 will be exemplified by a method depicted by Figs. 10, 11 and 12 for producing a tube like that shown in Fig. 2 having a single annulus of unvulcanizable easily displaceable plastic composition 26.

In the production of a tube of this type, several thin sheets of vulcanizable material are rolled off from a rubber calender and plied up, one upon the other, forming a long continuous sheet from which suitable sizes and shapes can be cut, depending upon the dimensions of the ultimate tube to be formed, whereupon a piece of stock thus cut is placed upon a revolving drum 56 and its ends secured together to form a flat endless belt 30 which will define the major wall of the finished tube. A preformed body of unvulcanizable easily displaceable plastic composition 26, prepared by extrusion or otherwise, is next applied in its proper position with respect to the belt 30 and its ends are secured together to form an annulus. Then a preformed cover strip 32 of vulcanizable material is superimposed upon the plastic composition to form an annulus having its ends secured together and its edges secured to the exposed contiguous surface of the belt 30.

The remote edges of the belt 30 are then brought together as shown in Fig. 11 and secured to form a tubular body having the plastic composition and its cover strip within the tube. This composite tube is then stripped from the drum 56, placed in a sectional mold 54 with the plastic composition symmetrically disposed with respect to the generatrix axis 22 and the tube inflated by means of a suitably disposed valve in accordance with standard practice, or by means of a hollow needle if the plastic composition is self-healing or sealing and the use of a valve is not desired. The inflated tube is then cured and a bond between the cover strip and tube wall firmly established. The completed tube as depicted in Fig. 12, is then removed from the mold ready for use.

The several modifications described with reference to the drawings will be serve to illustrate the invention, but these examples should not be construed as limiting the invention beyond the scope of the appended claims.

I claim:

1. An inner tube for pneumatic tires comprising a resilient tubular body having a wall defining bead and rim zones, an unvulcanizable easily displaceable plastic composition internally surfacing said wall from points displaced on said wall by an arc not exceeding 120° and bridging said zones, and resilient material secured to said body confining said composition.

2. An inner tube for pneumatic tires comprising a resilient tubular body having a wall defining bead zones, an unvulcanizable easily displaceable plastic composition extending from points displaced on said wall by an arc not exceeding 120° and reinforcing said wall at said bead zones, and resilient material secured to said body confining said composition.

3. An inner tube for pneumatic tires comprising a resilient tubular body having a wall defining bead and rim zones, an unvulcanizable easily displaceable plastic composition externally surfacing said wall from points displaced on said wall by an arc not exceeding 120° and bridging said zones, and resilient material secured to said body confining said composition.

4. An inner tube for pneumatic tires comprising a resilient tubular body having a wall defining bead and rim zones, an unvulcanizable easily displaceable plastic composition coating said wall from points displaced on said wall by an arc not exceeding 120° throughout said zones, and resilient material secured to said body confining said composition.

5. An inner tube for pneumatic tires comprising a resilient tubular body having a wall defining bead and rim zones, and an unvulcanizable easily displaceable plastic composition extending from points displaced on said wall by an arc not exceeding 120° and bridging said zones, and resilient material secured to said body confining said composition.

6. An inner tube for pneumatic tires comprising a resilient tubular body having a wall defining bead and rim zones, spaced annular layers of unvulcanizable easily displaceable plastic composition bridging said zones, and resilient material secured to said body confining said composition.

7. In combination, a wheel rim, a tire casing having beads seated on said rim defining an annular chamber, a resilient inflatable tube received in said chamber, and an annular body of unvulcanizable easily displaceable plastic composition interposed between portions of said tube through an arc not exceeding 120° measured on a transverse section of said tube and chamber bridging said beads and rim.

8. In combination, a wheel rim, a tire casing having beads seated on said rim defining an annular chamber, a resilient inflatable tube received in said chamber, and spaced annular bodies of unvulcanizable easily displaceable plastic composition interposed between portions of said tube and chamber bridging said beads and rim.

9. In combination, a wheel rim, a tire casing having beads seated on said rim defining an annular chamber, a resilient inflatable tube received in said chamber, and an annular body of unvulcanizable easily displaceable plastic composition secured to said tube through an arc not exceeding 120° measured on a transverse section of said tube and bridging said beads and rim.

10. In combination, a wheel rim, a tire casing having beads seated on said rim defining an annular chamber, a resilient inflatable tube received in said chamber, and an annular body of unvulcanizable easily displaceable plastic composition having a vulcanizable cover secured to said tube through an arc not exceeding 120° measured on a transverse section of said tube and bridging said beads and rim.

11. An inner tube for pneumatic tires comprising a resilient tubular body having a plane including the path of the center of its generatrix and a wall defining bead zones and a rim zone; an unvulcanizable easily displaceable plastic composition extending, from portions of said body displaced symmetrically by approximately 120° with respect to said plane, and beyond said bead zones towards said rim zone; and resilient material secured to said body confining said composition.

12. An inner tube for pneumatic tires comprising a resilient tubular body having a plane including the path of the center of its generatrix and a wall defining bead zones and a rim zone; an unvulcanizable easily displaceable plastic composition extending, from portions of said body displaced symmetrically by an angle not substantially exceeding 120° with respect to said plane, and beyond said bead zones towards said rim zone; and resilient material secured to said body confining said composition.

13. An inner tube for pneumatic tires comprising a resilient tubular body having a plane including the path of the center of its generatrix and a wall defining bead zones and a rim zone; an unvulcanizable easily displaceable plastic composition extending, from portions of said body displaced symmetrically by an angle greater than 90° but not substantially exceeding 120° with respect to said plane, and beyond said bead zones towards said rim zone; and resilient material secured to said body confining said composition.

14. An inner tube for pneumatic tires comprising a resilient tubular body having a plane including the path of the center of its generatrix and a wall defining bead zones and a rim zone; an annular layer of unvulcanizable easily displaceable plastic composition extending, from portions of said body displaced symmetrically by approximately 120° with respect to said plane, and beyond said bead zones towards said rim zone; and resilient material secured to said body confining said composition.

15. An inner tube for pneumatic tires comprising a resilient tubular body having a plane including the path of the center of its generatrix and a wall defining bead zones and a rim zone; spaced annular layers of unvulcanizable easily displaceable plastic composition extending, from portions of said body displaced symmetrically by approximately 120° with respect to said plane, and beyond said bead zones towards said rim zone; and resilient material secured to said body confining said composition.

16. An inner tube for pneumatic tires comprising a resilient tubular body having a plane including the path of the center of its generatrix and a wall defining bead zones and a rim zone; an unvulcanizable easily displaceable plastic composition extending substantially uninterruptedly from portions of said body displaced symmetrically by approximately 120° with respect to said plane, and beyond said bead zones towards said rim zone; and resilient material secured to said body confining said composition.

17. An inner tube for pneumatic tires comprising a resilient tubular body having a plane including the path of the center of its generatrix and a wall defining bead zones and a rim zone; an unvulcanizable easily displaceable plastic composition extending, from portions of said body displaced symmetrically by approximately 120° with respect to said plane, and beyond said bead zones towards said rim zone; and a covering vulcanized to said body confining said composition.

18. An inner tube for pneumatic tires comprising a resilient tubular vulcanizable body having a plane including the path of the center of its generatrix and a wall defining bead zones and a rim zone; an unvulcanizable easily displaceable plastic composition extending, from portions of said body displaced symmetrically by approximately 120° with respect to said plane, and beyond said bead zones towards said rim zone; and resilient vulcanizable material secured to said body confining said composition.

JAMES W. WABER.

REFERENCES CITED

The following references are of record in the file of this patent:

UNITED STATES PATENTS

| Number | Name | Date |
| --- | --- | --- |
| 1,285,719 | Jeffries | Nov. 26, 1918 |
| 1,474,011 | Allyn | Nov. 13, 1923 |
| 1,564,397 | Armstrong | Dec. 8, 1925 |
| 1,639,599 | Francis | Aug. 16, 1927 |
| 1,683,454 | Fetter | Sept. 4, 1928 |
| 1,903,355 | Berger | Apr. 4, 1933 |
| 2,237,245 | Wilson et al. | Apr. 1, 1941 |
| 2,414,145 | Evans | Jan. 14, 1947 |
| 2,427,447 | Dicks | Sept. 16, 1947 |

FOREIGN PATENTS

| Number | Country | Date |
| --- | --- | --- |
| 24,911 | Great Britain | 1901 |

OTHER REFERENCES

India Rubber World, pages 56, 58, April 1, 1931.